United States Patent
Bossoni et al.

(10) Patent No.: US 11,853,039 B2
(45) Date of Patent: Dec. 26, 2023

(54) ADDITIONAL VERIFICATION OF WORKPIECE PROPERTIES FOR A LASER CUTTING MACHINE

(71) Applicant: BYSTRONIC LASER AG, Niederoenz (CH)

(72) Inventors: Sergio Umberto Bossoni, Zurich (CH); Wilfried Liegard, Bern (CH)

(73) Assignee: BYSTRONIC LASER AG, Niederoenz (CH)

( * ) Notice: Subject to any disclaimer, the term of this patent is extended or adjusted under 35 U.S.C. 154(b) by 0 days.

(21) Appl. No.: 18/252,863

(22) PCT Filed: Dec. 15, 2021

(86) PCT No.: PCT/EP2021/085833
§ 371 (c)(1),
(2) Date: May 12, 2023

(87) PCT Pub. No.: WO2022/129132
PCT Pub. Date: Jun. 23, 2022

(65) Prior Publication Data
US 2023/0324889 A1 Oct. 12, 2023

(30) Foreign Application Priority Data
Dec. 18, 2020 (EP) .................................... 20215656

(51) Int. Cl.
*G05B 19/418* (2006.01)
*G05B 19/401* (2006.01)

(52) U.S. Cl.
CPC ....... *G05B 19/4183* (2013.01); *G05B 19/401* (2013.01); *G05B 2219/45041* (2013.01)

(58) Field of Classification Search
CPC .............. G05B 19/401; G05B 19/4183; G05B 2219/45041

(Continued)

(56) References Cited

U.S. PATENT DOCUMENTS

| 6,593,541 B1 * | 7/2003 | Herren | B23P 23/02 |
| | | | 219/121.73 |
| 2007/0106416 A1 * | 5/2007 | Griffiths | H01L 22/24 |
| | | | 257/E21.527 |

(Continued)

FOREIGN PATENT DOCUMENTS

| CN | 109862996 A | * | 6/2019 | | B23Q 7/12 |
| CN | 111050984 A | * | 4/2020 | ......... | B23K 26/0884 |

(Continued)

OTHER PUBLICATIONS

International Search Report and Written Opinion, dated Apr. 8, 2022, from PCT/EP2021/085833.

(Continued)

*Primary Examiner* — Ronald D Hartman, Jr.
(74) *Attorney, Agent, or Firm* — Workman Nydegger (57) ABSTRACT

The present invention relates to a checking tool and a method for checking whether a laser cutting machine is provided with a correct workpiece from a set of workpieces, comprising the method steps of:
  Detecting actual workpiece properties of a workpiece which is provided or is prepared to be provided to the laser cutting machine for cutting;
  Providing a set of cutting plans, wherein one cutting plan of the set of cutting plans is forwarded to a control unit of the laser cutting machine, wherein each cutting plan is associated to target workpiece properties;
  Comparing the detected actual workpiece properties with the target workpiece properties, and providing a comparison result, indicating whether the correct workpiece is provided according to the cutting plan;
  Depending on the comparison result: Issuing a stop signal to stop the cutting process or issuing an adaption signal to change the sequence in the set of cutting plans.

14 Claims, 8 Drawing Sheets

(58) Field of Classification Search
USPC .......................................................... 700/117
See application file for complete search history.

(56) References Cited

U.S. PATENT DOCUMENTS

| | | | |
|---|---|---|---|
| 2013/0213943 A1* | 8/2013 | Takada ................... | B23K 26/38 |
| | | | 219/121.69 |
| 2017/0109874 A1* | 4/2017 | Hallasch ................. | B23K 26/60 |
| 2017/0151629 A1* | 6/2017 | Hagenlocher ........ | B23K 26/048 |
| 2019/0243343 A1 | 8/2019 | Kiefer et al. | |
| 2020/0130107 A1* | 4/2020 | Mochizuki ......... | B23K 26/0626 |
| 2020/0218235 A1 | 7/2020 | Kiefer et al. | |

FOREIGN PATENT DOCUMENTS

| | | | | |
|---|---|---|---|---|
| DE | 102018126077 A1 * | 4/2020 | ......... | B23K 26/0869 |
| EP | 3839676 A1 | 6/2021 | | |
| WO | 2018073310 A2 | 4/2018 | | |

OTHER PUBLICATIONS

International Preliminary Report on Patentability, dated Oct. 7, 2022, from PCT/EP2021/085833.

\* cited by examiner

ADDITIONAL VERIFICATION OF WORKPIECE PROPERTIES FOR A LASER CUTTING MACHINE

DESCRIPTION

The present invention relates to a method and a tool for checking whether a correct workpiece is loaded to a laser cutting machine for subsequent execution of a laser cutting process. Further, the invention relates to a laser cutting machine with such a tool, a computer program and a computer readable storage medium.

Modern industrial laser cutting machines are intended to cut workpieces, like metal sheets, as efficient as possible. For this purpose, the workpieces which need to be cut, are to be provided or loaded to the laser cutting machine in the correct sequence and in due time. An automation system may be used for providing or loading a workpiece of a set of workpieces, which may be stored in a storage system of the automation system to the laser cutting machine. Usually, the automation system is completely separated from the laser cutting machine from a control point of view.

In prior art solutions, no check is available to verify if the correct workpiece (e.g., metal sheet) is loaded so that the cutting plan, which has been loaded to a control unit of a laser cutting machine, may be executed.

Especially in unmanned shifts, many workpieces need to be processed fully automatically, so that the automation system has to provide and process a big set of workpieces to be provided in a step-by-step mode to the laser cutting machine so that the laser cutting machine, in turn, may execute the intended sequence of cutting plans.

For example, a cutting plan may be directed to cutting a certain type of the workpiece (e.g., a particular alloy) having a certain thickness and with certain other material properties. Typically, a so-called cutting job may comprise a sequence of cutting plans, wherein each of the cutting plans is related to (cutting) a certain workpiece with certain properties.

In state-of-the-art systems, the automation system is usually instructed by the laser cutting machine and if the automation system may not provide the requested workpiece, a failure is generated and manual interaction is required, which evokes costs. When using an automation system, generally, the laser cutting process relies on the automation process, as the cutting machine can only cut those workpieces which have been loaded by the automation system, in a preceding loading step. Because the laser cutting machine cuts one workpiece after the other (sequentially), both processes (providing/loading the workpiece and cutting the workpiece) need to be aligned. In case of non-alignment, there may be situations, where the cutting plan for cutting the particular workpiece e.g., with properties abc is loaded in a control unit of the laser cutting machine, however, the automation system has prepared another workpiece with different properties xyz to be loaded in the laser cutting machine. Then, the wrong workpiece is loaded in the cutting machine. Thus, for example if the prepared and loaded set of workpieces is not correct and e.g., a metal sheet with a wrong thickness is loaded, in prior art systems, this may lead to a stop of the production or to the production of parts in the wrong sheet thickness, which may result in trash production.

Another scenario is to be seen in a setting without automation. Also, in this setting, an operator may load a wrong workpiece by mistake, e.g., on a working table. In this case, when processing the workpiece without further analysis, the properties, defined in the cutting plan do not match the actual workpiece properties, which also may result in trash production.

So, especially when workpieces with different workpiece properties (different material types and/or different thickness) need to be cut in an automated way, a wrong preparation (for example incorrect loading by the automation system or incorrect manual loading) can lead to trash production, which has to be avoided.

Based on the prior art of automated laser cutting systems, mentioned above, the present invention has the object to further automate laser cutting processes by improving quality and efficiency. Further, trash production due to a cutting of wrong workpieces, should be avoided.

At least some of these problems are solved, at least in part, by the present application, which relates to a method for checking whether a laser cutting machine is provided with a correct workpiece from a set of workpieces, by a checking tool, by a laser cutting which machine, operated according to said method, by a computer program and by a computer readable storage medium according to the appended independent claims.

Advantageous aspects, features and embodiments are described in the dependent claims and in the following description together with their respective advantages.

In the following, the solution according to the invention is described with respect to the claimed checking method. Features, advantages or alternative embodiments mentioned with respect to the method can also be assigned to the other claimed or described subject matters (e.g., the checking tool, the computer program or a computer program product) and vice versa. In other words, the subject matter of the apparatus can be improved or further developed with features described or claimed in the context of the method. In this case, the functional features of the method are embodied by structural units of the apparatus, configured to dedicatedly execute this function and vice versa, respectively. Generally, in computer science at least from a computational point of view, a software implementation and a corresponding hardware implementation are equivalent. Thus, for example, a method step for "detecting" data may be performed with a set of "detectors" and respective instructions to measure data or to access sensors. For the sake of avoiding redundancy, these embodiments are not explicitly described again for the apparatus, because they have been described already in relation to the method.

According to a first aspect the present invention thus relates to a computer implemented method for verifying or checking whether a laser cutting machine is provided with a correct workpiece from a set of workpieces. This is executed by detecting actual workpiece properties of the workpiece which is already provided (or loaded) to the laser cutting machine or which is prepared to be provided to the laser cutting machine. For example, detecting may be done, when a workpiece has been or is determined by the automation system to be fetched from a storage system with a set of workpieces (e.g., cassettes) for being transferred or forwarded to a shuttle table or another support member for providing the particular workpiece to the laser cutting machine. Detecting may be executed by a set of different sensors for measuring physical properties of the workpiece before the cutting process starts. The laser cutting machine is operated with a set of cutting plans which may be provided in a set or sequence, in particular as a cutting job. Therefore, the method comprises the step of providing a setting of cutting plans or a cutting job, wherein each cutting plan is associated dedicatedly and specifically to target workpiece properties. Typically, the cutting plans are executed in a batch mode, so that one cutting plan is processed after the other. So, one cutting plan is forwarded to a controller (CNC) of the laser machine (also named as the 'actual' cutting plan, which is going to be executed next) for execution at a time. Each of the cutting plans is associated to target properties of the workpiece to be cut. For example, a first cutting plan is associated to a workpiece, being steel in 8 mm thickness and a second cutting plan is associated to cut workpiece, being a 4 mm aluminum sheet. So, with the invention and also in this example, it is assured, that first the steel metal is provided to the laser cutting machine and second the aluminum sheet so that the sequence of cutting plans corresponds to the correct sequence of workpieces. "Correct" in this respect is to be construed as "matching or corresponding properties according to the actual cutting plan". After the actual workpiece properties have been detected, processing means are configured to compare the detected actual workpiece properties with target workpiece properties, which are indicated in the actual cutting plan which is provided to a control unit of the laser cutting machine. Comparison is executed by a comparison algorithm and provides a comparison result. The comparison result is binary, indicating whether there is a match/correspondence or not, i.e., whether the correct workpiece is loaded according to the requirements of the (actual) cutting plan. The comparison result may be provided, for example on a user interface and/or may be provided to a central monitoring server. Depending on the comparison result, the cutting process may go on as intended (in case of a correct loading) or a stop signal may be issued to initiate a stop of the cutting process. Alternatively, or cumulatively an adaption signal may be generated and issued. The adaption signal serves to change or amend the sequence in the set of cutting plans. In the example, given above, where the workpieces are loaded in the wrong sequence, the sequence of cutting plans (in the cutting job) may be altered, so to correspond to the originally "wrong" sequence of workpieces. Thus, in this example, first the second cutting plan is executed and subsequently the first cutting plan.

According to the present invention, the situation mentioned above, where a "wrong" workpiece is loaded to or is prepared to be loaded to the laser cutting machine is automatically determined. Further, a wrong processing (cutting) may be avoided. Moreover, further processing of the laser cutting process may be modified according to the detected actual workpiece properties.

With this solution, the disadvantages of prior art systems, mentioned above may be avoided. This makes the processing pipeline more reliable, even by providing a higher degree of automation.

Usually, stacks of different sheets are prepared for a night shift to be processed automatically. If the order is not correct or in other words if it does not correspond to the order or sequence of the cutting plans (e.g. prepared on or provided to the cutting machine), according to the solution, described in this application, it is automatically checked and verified, that it cannot happen at some point that the cutting plan for a workpiece, e.g. sheet with 6 mm steel, is loaded and the machine cuts according to a cutting plan for a workpiece with other target properties, e.g. 10 mm sheet, resulting in waste part production. This error may be avoided by the present invention.

Another advantageous effect will be created in case when a workpiece (e.g., sheet) is loaded with a nominal thickness of 3 mm and a real thickness of 2.8 mm (detected actual workpiece properties). The parts might not be cut ok, unless another cutting plan will be selected with matching settings (matching to the actual workpiece properties).

"Actual workpiece properties" are the workpiece properties which are detected at the workpiece which is currently loaded or which is initiated or prepared to be loaded to the laser cutting machine. The latter may occur, if the workpiece is placed on the support table (e.g., shuttle table). Actual workpiece properties relate to the material of the workpiece. Actual workpiece properties are not dependent on and thus are agnostic to laser processing. For example, if a particular type of material (e.g., steel) and a particular material thickness (10 mm) are detected, these properties remain the same before, during and after cutting. The actual workpiece properties alone are not decisive for quality evaluation. The actual workpiece properties may be detected by means of a set of sensors and/or by reading in a code. For instance, the sensors may be configured for measuring a thickness and/or a material type of the workpiece. The sensors are not configured for detecting characteristics of the cutting process (like the kerf width, inclination angle etc.). The actual workpiece properties are preferably detected before the cutting process is initiated for the respective workpiece in order to avoid failures.

"Target properties" are also properties of a workpiece, but this type of properties relates to those properties which are indicated or defined in the actual cutting plan, wherein the actual cutting plan is the cutting plan, which has been loaded in the CNC control of the laser cutting machine or which is intended to be executed thereon next. Target properties may thus be referred to as "expected" properties according to the cutting plan of the cutting plan sequence. Target properties are the correct properties, meaning that if the detected actual workpiece properties are identical with the target properties, then the cutting may be initiated and the laser may start cutting as the correct workpiece (with the correct properties) is loaded. Otherwise the cutting is stopped or interrupted or an adaption process is initiated to adapt the intended cutting.

Thus, target properties relate to the very properties (e.g., thickness, type of material and/or others) which are associated to a particular, namely to the actual cutting plan ('actual' means, which is intended to be executed next by the laser cutting machine). Target properties (such as e.g., the material thickness and/or material properties) may be encoded directly in the cutting plan or indirectly (by reference or with a link, pointing to an external storage address). The target properties may also be defined in a separate stored data structure, which is linked to the cutting plan. Target properties may, alternatively or cumulatively be deduced from cutting parameters.

A cutting plan defines which workpiece of a set of workpieces is to be processed (e.g., cut) and how the workpiece needs to be cut (cutting pattern). It is usually provided in a ccp-file format, which is specific for engineering tasks or ncp-, lcc file formats can be used too. The cutting plan may be compiled by a compiler (e.g., C++ compiler, locally on the laser cutting machine). The cutting plan may be generated on the laser cutting machine or on an external machine and forwarded to the laser cutting machine as a file. For example, the cutting plan may define that a first workpiece of the set of workpieces needs to be cut with a first set of cutting parameters (laser power, focus layer, feed rate etc.), whereas a second workpiece of the set of workpieces needs to cut with a different second set of cutting parameters. Therefore, it is necessary, to evaluate if the correct workpiece of a set of workpieces is loaded on or provided to the laser cutting machine. If not, the workpiece will be cut incorrectly namely with the wrong laser cutting parameters, which is to be avoided. If this is detected, the cutting is stopped or an adaptation is carried out to change the cutting parameters and more particular to choose the cutting parameters such that they match to the instant actual workpiece properties which have been detected.

A set of cutting plans (a cutting job) is provided and one of the cutting plans is forwarded to the control unit. The selection of the one particular cutting plan depends on the workpiece to be cut and its properties. A crucial aspect of the invention is that the selected cutting plan is the very cutting plan which is adapted to or configured for the actual workpiece with its properties. Thus, it is important, that the correct workpiece is loaded in the laser cutting machine. To be more exactly, the selected cutting plan has to be correspondent to or needs to match with the actual loaded workpiece (and vice versa).

Another advantageous effect will be created in case the sheet thickness is correct (i.e., the detected actual workpiece thickness is equal—or similar in a tolerance range—to the target thickness, according to the cutting plan), but the material is wrong (detected actual material in different form the target material associated in the cutting plan), which also results in waste parts cut. With the solution mentioned herein, this situation will be determined and countermeasures may be initiated in order to avoid improper handling (cutting).

The workpiece typically is a sheet or tubular workpiece, like e.g., a metal sheet. Typically, parts of the workpiece have to be cut-out of the workpiece according to the cutting plan. The workpiece properties (actual and/or target) relate to the physical properties of the workpiece, being relevant for cutting. The workpiece properties may e.g., refer to a thickness, dimensions, a material type, type of alloy, rigidity, stiffness, hardness and/or a tensile strength and/or other features of the workpiece (e.g., sheet metal)

A workpiece is provided to or loaded in the cutting machine. For this purpose, the workpiece may be loaded on a shuttle or working table. Typically, a workpiece of a set or sequence of workpieces are loaded one after the other in the laser cutting machine. This may be executed by means of an automation system. Alternatively, providing the workpiece may also be done manually, by determining a particular workpiece from a storage system and forwarding the same to the working table.

The automation system is a system which controls and executes material flow, in particular with respect to the laser cutting machine. The automation system improves machine use and increases work and process reliability. The building blocks are preferably modular so that the degree of automation can be adapted at a later date. The degree of the automation may be configured so to provide solutions ranging from simple handling to fully automatic operation. For example, the automation system may be used for automatically loading sheet metal quickly and reliably onto the shuttle table. The automation system may use one or more cassettes for storing the workpieces and/or makes use of a mobile storage and retrieval system for handling the sheet workpieces automatically. The automation system may comprise or makes use of a storage system, for storing sheet material to be cut, like for example a tower-based system for lightly-manned production. The automation system may enable unsupervised production.

The laser cutting machine may be a fiber or a $CO_2$ laser. Generally, the $CO_2$ laser cutting machine may process a wide variety of materials and thick metal sheets. A fiber laser cutting system, on the other hand, is capable of processing the thin to thick range of sheet thicknesses with materials ranging from steel, stainless steel, and aluminum, right through to non-ferrous metals (copper and brass).

The laser cutting machine comprises a control unit, e.g., a CNC, a Computerized Numerical Control, which is configured to control the laser cutting process of the laser cutting machine. Usually, one cutting plan after the other is provided to the control unit (plan 1, plan 2, plan 3 etc.). After the first plan has been finished, the second plan is executed and so on and so forth. Usually, further data are also provided to the control unit as well, like machine parameters, variables etc. The further data may be loaded from a database.

The working table is a support member for providing workpieces in particular sheet metal workpieces to and from the laser cutting machine. In a preferred embodiment the working table is an exchange table, also called 'shuttle table', which allows to operate two workpieces separately in parallel. For more constructional details of the working table or shuttle table it is referred to WO2018073310A2.

"Detecting" relates to determining or measuring actual workpiece properties. Detecting is executed for the purpose of characterizing or specifying the respective workpiece. Detecting is not intended for quality assessment of a cutting result. In particular, detecting is executed prior to cutting.

Detecting may be executed with a set of different sensors for measuring physical properties of the workpiece, e.g., thickness, material type, alloy etc. Sensors may comprise optical sensors (e.g., a CCD camera) or other sensors for detecting physical properties of the workpiece.

Detecting may be executed in different time phases and in different positions and/or status of the workpiece in the processing pipeline for laser cutting. According to an embodiment, detecting may be executed before the workpiece is loaded on a working table (e.g., on an exchange or shuttle table). This could e.g., be done in or on behalf of an automation system. According to another embodiment, the detecting may be done when or during the workpiece is already positioned on a working table and before entering the laser cutting machine. In still another embodiment, detecting may be done when the workpiece has entered the laser cutting machine and is placed inside the laser cutting machine, but still before cutting has started.

Preferably, detecting takes place when a workpiece is loaded on the working table or when the workpiece is prepared to be loaded thereon. In the latter case the detecting is executed prior to loading, which has the technical effect, that wrong loading may be avoided, which saves cost and time.

The loading of the workpiece may be performed by an automation system in fully or partly autonomous manner. The automation system may e.g., access cassettes in a storage system (tower) with different types of workpieces and transfer them automatically to the working table. The automation system is controlled by instructions. Preferably, the instructions to instruct the automation system may be received form the laser cutting machine. In prior art systems, typically, the automation system had no communication channel back to the laser cutting machine to report any problems, e.g., in case the requested workpiece (with the requested workpiece properties) is not available (or not stored). This kind of feedback channel is not provided with the solution presented herein. Now, the automation system may generate a message "workpiece not available" and forward this message to the laser cutting machine. In turn, the laser cutting machine, may then initiate counter measures, e.g., switch to another cutting plan and request another workpiece and/or provide the message at a user interface on the laser cutting machine to inform the operator. As an advantage, an additional communication channel between automation system and laser cutting machine is provided. The additional communication channel is preferably a bidirectional channel, supporting message exchange in both directions.

The target properties of the workpiece to be cut may be defined in the cutting plan and/or may be defined separately in a target property data structure stored in a storage, which is linked to the cutting plan.

As mentioned above, the cutting plan is loaded into a controller (e.g., CNC) of the cutting machine. Further, parameters and/or variables may be loaded from a database and/or may be provided by an operator of the laser cutting machine by means of a user interface. Usually, a cutting plan is provided in a set of cutting plans, which may be referred to as cutting job. Thus, in a simplified form, the cutting job may comprise:

a first cutting plan for a first workpiece with first properties,
a second cutting plan for a second workpiece with second properties,
a third cutting plan for a third workpiece with third properties and so on and so forth.

Generally, the cutting plan is an electronic file with instructions to control the laser cutting machine for cutting a particular workpiece with specific properties. The cutting plan typically is associated to a set of different workpiece properties. For example, a first cutting plan may provide cutting instructions for cutting a steel metal sheet with a thickness of 10 mm, a second cutting plan may provide cutting instructions for cutting an aluminum sheet with a thickness of 5 mm and a third cutting plan may provide cutting instructions for cutting an aluminum sheet with a thickness of 3 mm and so on and so forth. The processing of a cutting job comprises sequential processing of its cutting plans. For instance, the cutting plan may thus be processed in a batch mode. The cutting plan may be provided, processed and stored in a data structure. The data structure may be a table structure. The cutting plan may be generated by means of software (e.g., BySoft 7 or other cad-cam systems) on a computer, which usually is separate from the laser cutting machine.

The steps of the method (inter alia detecting, providing, comparing, issuing) may be executed prior to cutting and in particular before the cutting process has been started.

The steps of the method (inter alia detecting, providing, comparing, issuing) may be executed on the same or on different entities. For example, the step of detecting may be performed on a mobile device and the steps of providing and comparing may be executed on another entity or device (e.g., the laser cutting machine or a device in data connection with the same). In another example, the steps of detecting and providing and comparing may be executed on an automation system and the steps of issuing the stop and/or adaption signal may be provided on the laser cutting machine or connected parts thereof, e.g., on a user interface of the laser cutting machine.

In a preferred embodiment a first alert signal is issued, when the comparison result indicates or reflects a mismatch, in particular a mismatch between the detected actual workpiece properties and the target properties, indicated in the cutting plan. Alternatively, or cumulatively, a second alert signal may be issued in case of issuance of the adaption signal, indicating that the sequence of the set of cutting plans is to be changed or has been changed.

In a preferred embodiment, the second alert signal may comprise a verification signal request on a user interface. This improves transparency of the method. With this, the operator at the laser cutting machine will be informed immediately in case of a mismatch (first alert signal) and will be informed immediately in case a change in the cutting plan sequence is suggested automatically by the machine (adaption signal). This has the advantage that the operator at the machine gets still the option to check the suggested adaption or change in the cutting plan sequence. With this, he or she may verify the recommendation or deny the same. Depending on this user input (verification signal given or not), the method may proceed further.

The alert signal may be of a variety of types. It may be an optical, acoustic and/or another format. Preferably, in a configuration phase, the type of alert signal may be configured to adapt to the actual settings (e.g., acoustic noise). The reflected mismatch relates to a mismatch between actual workpiece properties and target properties according to the cutting plan, in particular, the specific cutting plan segment. In another embodiment, the first and second alert signal may be the same. The alarm signal may be issued on the laser cutting machine directly and/or on connected systems, including mobile devices with a software for monitoring the laser cutting process.

According to another preferred embodiment, the comparison result is stored in a storage, accessible by a failure analysis algorithm for execution of the same. In particular, the comparison result may be stored together with a time stamp and/or meta data. This embodiment may improve the automation system and may initiate remedy measures for iteratively providing the wrong workpiece. Further, the failure analysis algorithm which is based on measured value(s) may be configured for further analysis and statistics. In another embodiment, it may be used to process with artificial intelligence combining it with measurements from cutting or other data. The failure analysis algorithm may for example be used to improve loading of the automation system.

According to another preferred embodiment, detecting is performed by electronically reading-in a code, identifying the actual workpiece properties and accessing a storage with associated properties. The Code may be an electronic code, like an optical code, e.g., a barcode or a QR code. In other embodiments, the code may be provided as non-optical code, e.g., as a RF-ID code or another type of code. The code may be directly provided on the workpiece or may be electronically linked to the same. The code can be detected, for example, by means of using a barcode reader.

According to another preferred embodiment, detecting is performed by measuring actual workpiece properties by means of a set of sensors, wherein the sensor signals may be subject to rule-based processing algorithm to calculate the actual workpiece properties, based on the measured sensor signals. The rules represent the transforming of measured parameters into deducible parameters. For example, several measurements (e.g., for thickness, material type etc.) can be taken at different positions and/or timepoints and a mean value may be used for processing. Further, workpiece properties may be calculated algorithmically on the basis of sensed signals. For instance, from the combination of thickness and elastic bending the stiffness can be analyzed.

The set of sensors may comprise a variety of different sensors for different physical properties, like e.g., an optical sensor, an ultrasonic sensor, a magneto-resistive sensor, a position sensor, a sensor for measuring the thickness, a sensor for measuring the stiffness, rigidity and/or hardness of the workpiece or other sensor types. The set of sensors may be located and/or distributed over a plurality of different machines, like a loading and unloading machine, a multi-preprocessing machine and others.

According to another preferred embodiment, detecting is executed by a two-step procedure:
  detecting a thickness of the workpiece and
  detecting a type of material of the workpiece.

In another embodiment the sequence of processing steps for the detection may be altered so to first detect a type and then detect a thickness. Preferably, the two different detection steps are performed in parallel. It is also possible to execute the two steps in sequence. In another embodiment a multi-step procedure is executed by detecting further parameters, like a chemical composition of the type of material, e.g., alloy ("Legierung").

According to another preferred embodiment, comparing is executed by means of executing a comparison algorithm, which compares a first identifier related to the workpiece with a second identifier, related to a dataset in the cutting plan or associated to the cutting plan. In a simple embodiment, the comparison algorithm executes an identity operation between a set of paired values (for the different properties). It is possible to include a conversion function for processing a uniform data format and/or for adapting different measurements to each other.

The first identifier may be a physical code, like a barcode or QR code and the second identifier may be an entry in a data structure used for the cutting plan.

According to another preferred embodiment, the adaption signal to change the cutting plan comprises searching in the set of cutting plans a matching cutting plan with associated target properties which comply with the detected actual properties and to continue the cutting process with the matching cutting plan. Thus, as a technical advantage, the cutting needs not to be interrupted. Instead, the cutting may still be continued with another sequence of cutting plans which are re-structured according to the detected actual target properties of the workpieces and thus with another sequence of cutting plans.

According to another preferred embodiment, the comparison result is provided on an interface, in particular, a human machine interface (HMI), wherein the interface may be provided on the laser cutting machine and/or on a mobile device and/or on a central system.

The central system may be a so-called Manufacturing Execution System (MES) and/or a Manufacturing operations management (MOM), in particular a shop floor control system for administering and controlling the whole industrial processing workflow.

According to another preferred embodiment, the workpiece is loaded on the working table fully automatically by use of an automation system.

The automation system is controlled by instructions taking into account the cutting plan, which is provided on the laser cutting machine. In case an adaption signal is issued to change the cutting plan by amending the sequence of segments, this fact is instantaneously provided as change message to the automation system for providing amended instructions. The automation system may be or may comprise an automated loading system.

Alternatively, or in conjunction with the above, the method may further comprise the step of:
  generating a virtual representation of the comparison result.

The virtual representation of the comparison result may be stored in a storage. The stored comparison result may, for instance, be subject to later post-processing, e.g., failure analysis. The virtual representation may be output on a user interface. The virtual representation represents the two different results:
  1. No error. The correct workpiece is loaded and
  2. Error. The wrong workpiece is loaded.

The virtual representation may be implemented by graphical indication of the two different above-mentioned states (in a simple form, this may be a red/green light signal). The virtual representation thus provides an efficient output means and may instantaneously signal a mismatch, so that counter-measures (workpiece replacement or cutting plan sequence change) may automatically be carried out as soon as possible. Alternatively, or in conjunction with the above, the virtual representation may be used to automatically validate and, if needed, correct the procedure. Moreover, by using the virtual representation, the system may automatically infer the procedure to be carried out (e.g., replacement of the metal sheet) and in addition the user may be led towards a sequence of steps to be taken. Preferably, the user interface for output of the virtual representation may be implemented at the laser cutting machine locally. The virtual representation may also be provided on another user interface, e.g., at the automation system.

According to another aspect the invention relates to a checking tool for checking whether a laser cutting machine is provided with a correct workpiece from a set of workpieces, with processing means configured to perform the method as has been described above or according to above mentioned embodiments. For this purpose, the checking tool is configured or equipped with a measurement interface for detecting actual workpiece properties of a workpiece which is provided or is prepared to be provided to the laser cutting machine for cutting. Further, the checking tool is equipped with a cutting plan interface for receiving a set of cutting plans, wherein one of the received set of cutting plans is fed to a control unit of the laser cutting machine to be executed on a workpiece next. Each of the cutting plans is associated to target properties of the workpiece to be cut. The processing means are configured for comparing the detected actual workpiece properties with the target properties, indicated in the cutting plan, and providing a comparison result, indicating whether the correct workpiece is loaded on the working table. 'Correct' in this respect means 'according or in correspondence to requirements or specifications in the cutting plan'. The checking tool is further configured with an output interface for issuing a stop signal to stop the cutting process or for issuing an adaption signal to change the sequence of the set of cutting plans, both depending on the comparison result.

According to still another aspect the invention relates to a laser cutting machine with processing means configured to perform the method according as described above or with an interface to a checking tool as specified above.

According to still another aspect, the invention relates to a computer program comprising a computer program code, the computer program code when executed by a processing means to perform the steps of the method described above. The computer program may be stored in a computer readable storage medium. Thus, the invention also relates to such a computer readable storage medium, having the computer program stored.

In another aspect the invention relates to a computer program product comprising a computer program, the computer program being loadable into a memory unit of a computing unit, including program code sections to make the computing unit execute the method for checking as described above, when the computer program is executed in said computing unit. The realization of the invention by a computer program product and/or a computer-readable medium has the advantage that already existing laser cutting machine servers and/or clients (for instance embedded devices or controllers at the laser cutting machine) can be easily adopted by software updates in order to work as proposed by the invention.

According to the present invention, a computing unit may comprise a processing element (CPU, GPU, and the like) and storage means. The storage means may comprise at least a volatile primary memory (e.g., a RAM, a DRAM, a SRAM, a CPU cache memory, and the like), a non-volatile primary memory (e.g., a ROM, a PROM, an EPROM and the like), and/or a secondary memory. In particular, the volatile primary memory temporarily holds program files for execution by the processing element and related data and the non-volatile primary memory may contain boot-strap code for the operating system of the computing unit. According to the present invention, a computing unit may be a computer system including input and/or output devices and, more particularly, may be a mobile device, like a tablet, a smartphone, or the like, which is used by an operator of the laser cutting machine(s) on site. The computing unit may further comprise a network interface controller (NIC) configured to connect a secondary data processing system with a suitable network. According to the present invention, a suitable network may for instance be an intranet, a local area network (LAN) and a wide area network (WAN), the internet and/or a cellular network.

In particular, the interface between the laser cutting machine and the automation system may be implemented as a SOA interface (SOA: service oriented architecture) and in particular as open, cross-platform OPC-OA interface, which is a machine to machine communication protocol for industrial automation.

The order, according to which the steps of the method of the present invention are described in the present specification, does not necessarily reflect the chronological order, according to which said steps are carried out.

Further properties, features and advantages of this invention described above, as well as the manner they are achieved, become clearer and more understandable in the light of the following description and embodiments, which will be described in more detail in the context of the drawings. This following description does not limit the invention on the contained embodiments. Same components or parts can be labeled with the same reference signs in different figures. In general, the figures are not for scale.

DETAILED DESCRIPTION OF THE DRAWINGS AND EMBODIMENTS

The present invention provides a solution for preprocessing material data, relating to workpieces WP which should be cut by a laser cutting machine L, so that prior to feeding the laser cutting machine L with a specific type of workpieces WP it may be verified, whether or not the correct workpiece is provided according to specifications or requirements, stipulated in a cutting plan CP. In particular, it may be verified if the right sheet thickness or the right type of material is loaded.

Figure 1:
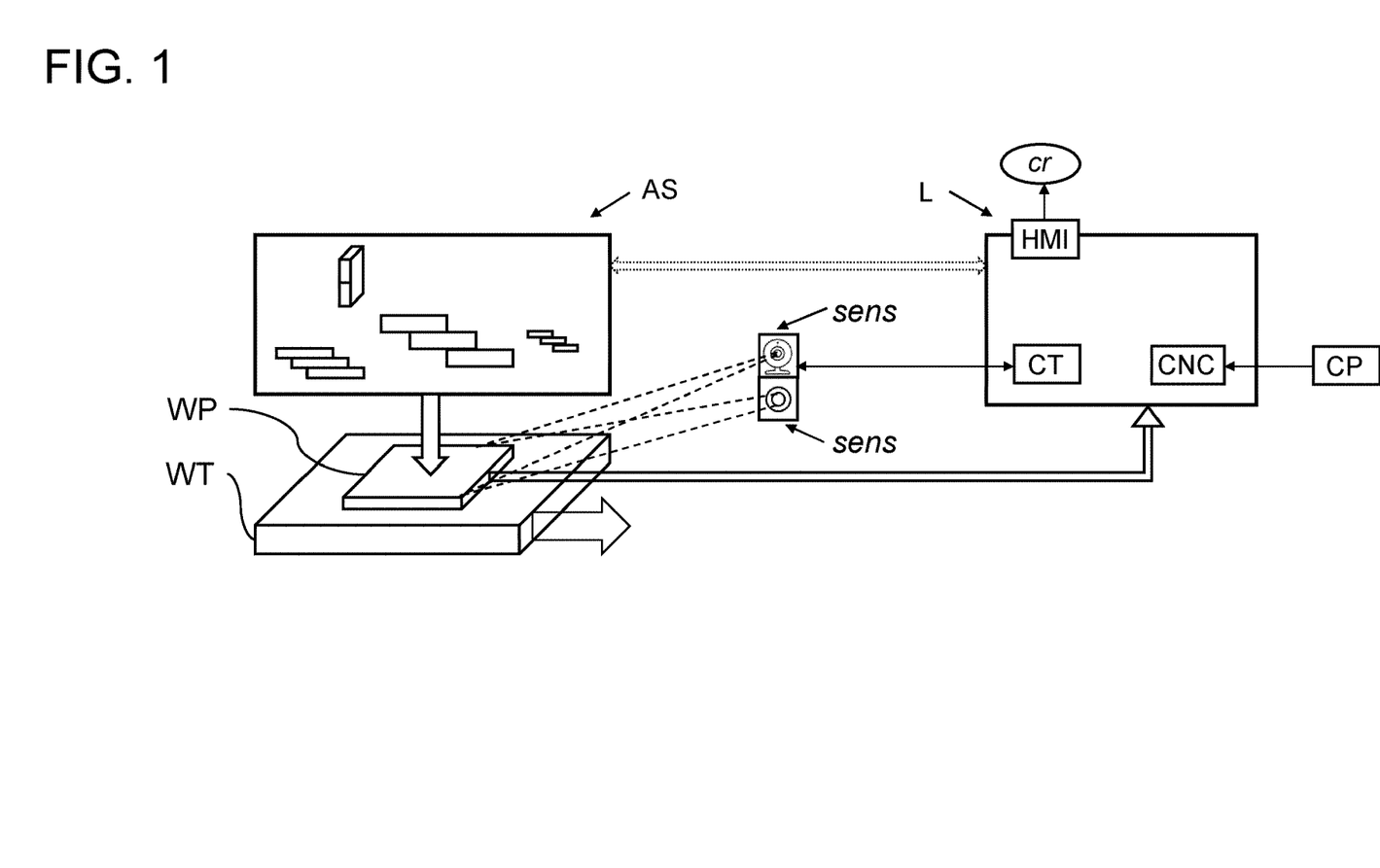
FIG. 1 is an overview of the structure and architecture of the system of the invention according to a preferred embodiment of the present invention.

FIG. 1 shows in a schematic representation an automation system AS with a storage of different workpieces WP. The workpieces WP may be provided in the form of sheet workpieces, in particular metal sheets. The workpieces WP do have different material properties, like different dimensions, different thickness, different type of material/alloy and/or different chemical or physical properties. The workpieces WP may be provided in a storage system and may be provided in a sorted form, i.e., in so-called "cassettes". The automation system AS is controlled by coded instructions, which may be received from an external system, in particular from the laser cutting machine L (or from another entity, like an e.g., an app or a central server) system or by input, provided on a human machine interface. According to the received instructions, the automation system AS fetches one workpiece WP from the stock and provides the same for loading to the laser cutting machine L. For this purpose, the workpiece WP may be positioned on a movable working table WT, which may be implemented as exchange table or shuttle table for feeding the workpieces WP to the laser cutting machine L. This should be represented by the double-line arrow in FIG. 1, pointing to the laser cutting machine L. This should represent a material transfer of the workpiece to be cut. The working table WT may be movable to load the workpiece into the laser L, indicated with the short arrow on the right side of the working table WT in FIG. 1. Typically, a set of sensor sens is provided (in FIG. 1, two different sensors are depicted, however, the sensor set may be extended by others). The sensors may be instructed by the checking tool CT, in particular, they may be activated or remain in a sleep mode. A set of sensors may be selected for measurement, where others may remain idle.

As can be seen in FIG. 1 as well, the automation system AS is in data communication with the laser cutting machine L, which is depicted in FIG. 1 with the dotted double-sided arrow. This could e.g., be implemented via an OPC-UA interface for message exchange.

Before or while the respective workpiece WP is forwarded to the laser cutting machine L, a set of sensors sens may be activated to detect actual workpiece properties awp of the workpiece, which is to be cut next. Here, different material properties may be detected, like the thickness and/or the type of material (steel or aluminum et cetera). This should be represented in FIG. 1 with the two dotted line-pairs from the set of sensors sens to the workpiece WP. The first sensor sens may be configured to measure the thickness and the second sensor sens may e.g., be configured to measure the type of material. For a person skilled in the art, it is clear, that also other and also more than one or two sensors may be provided and used for measuring further property values (e.g., stiffness, rigidity, hardness, weight, dimension etc.).

The detection of the actual workpiece properties awp may also be executed, when the workpiece WP is already fed to the laser cutting machine L, however, before the laser starts the cutting process.

So, in particular, there are three different embodiments for measuring the actual workpiece properties awp, which could be applied in parallel (cumulatively) or alternatively:

1. Measuring the actual workpiece properties awp by means of sensors sens on or within the automation system AS;
2. Measuring the actual workpiece properties awp by means of sensors sens on the exchange table or working table WT; and/or
3. Measuring the actual workpiece properties awp by means of sensors sens in the laser cutting machine L.

Generally, one measurement for one type of property (thickness or material etc.) may be taken. For instance, it is possible to measure the thickness at one dedicated position at the workpiece, e.g., left corner. In another preferred embodiment, more than one measurement may be taken for one property. For instance, it is possible to measure the thickness at several positions at the workpiece and to calculate a mean of all measurements in order to improve reliability.

The laser cutting machine L is provided with a checking tool CT and with a control CNC. From a set of cutting plans CP, and actual cutting plan is forwarded to the control CNC for instant execution. The checking tool CT is equipped with an interface to receive the measured or detected sensor data with the actual workpiece properties awp. Based on the actual workpiece properties awp and target workpiece properties twp, which are associated to or part of the actual cutting plan, a comparison algorithm is executed, in order to determine whether or not the actual workpiece properties awp equal the target workpiece properties twp. In case of conformity or compliance, the cutting process may continue as intended. The respective verification signal, for instance in form of a greenlight, may be provided as comparison result cr. In case of nonconformity, the cutting process will not continue as intended. Generally, there are two different options for further processing:

1. the cutting process stops and a stop signal is issued or
2. the cutting process continues, however, with another or an amended cutting plan. In this case an adaption signal may be issued. In a first option, another cutting plan is selected, namely the one with corresponding properties which do match with the detected actual workpiece properties awp. In a second option, the cutting plan is amended to adapt to the actual workpiece properties awp (e.g., if a thinner workpiece is detected than expected and requested, laser power may be reduced according to an e.g., rule-based adaption algorithm). In a third option, the sequence of loaded cutting plans is changed and the one is suggested for execution which has matching target workpiece properties twp.

For calculating the amended cutting plan, a database or a storage may be accessed, in which a sequence of cutting plans to be executed one after the other is stored, like for instance a first cutting plan CP1, a second cutting plan CP2, a third cutting plan CP3 . . . etc. Each cutting plan CP is associated to target workpiece properties twp. A comparison algorithm CA is configured to analyze the stored cutting plans CP1, CP2, CP3 with respect to their associated target workpiece properties twp. In case, a cutting plan is determined with target workpiece properties twp, matching the actual workpiece properties awp, this cutting plan may be ordered as number one in the sequence of cutting plans so that it will be executed next and in accordance to the workpiece WP with matching properties.

With this step of additional verification, it can be avoided, that workpieces WP are cut according to a wrong cutting plan.

Figure 2:
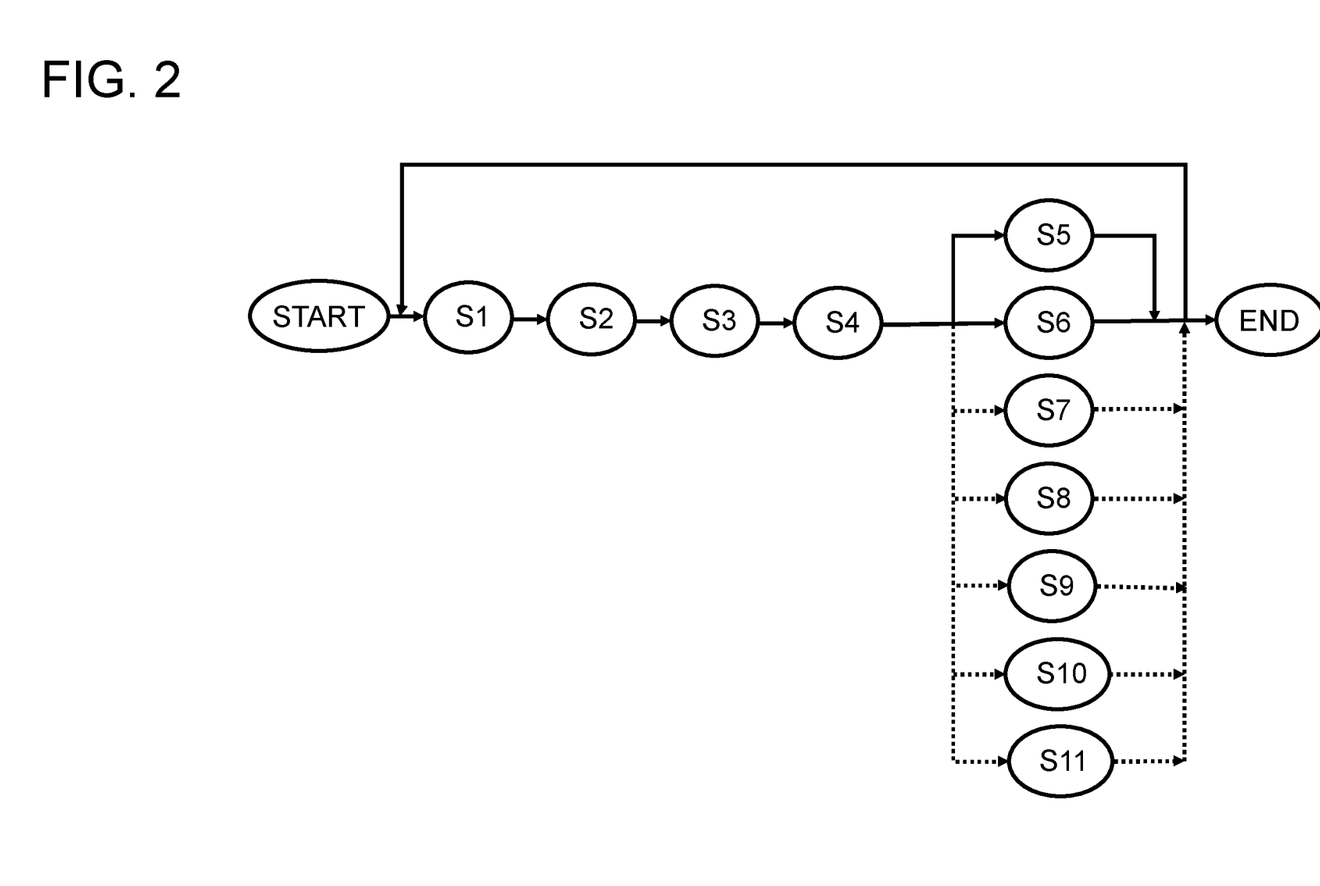
FIG. 2 is a flow chart for a method with optional method steps according to several preferred embodiments of the present invention.

FIG. 2 shows a flow chart of a method for checking whether the laser cutting machine L is loaded with the correct workpiece WP according to a preferred embodiment. In step S1 the actual workpiece properties awp of the workpiece WP, which is to be provided to the laser cutting machine next, is/are detected. This may be done by activating a set of sensors sens. In step S2 a set of cutting plans is provided, wherein one of the set of cutting plans is forwarded to the controller CNC of the laser cutting machine L. Thus, this forwarded cutting plan is intended to be executed next. In step S3, the comparison algorithm may be executed in order to compare the detected actual workpiece properties awp with the target workpiece properties twp for providing a comparison result cr (matching or non-matching) in step S4. After having provided the comparison result cr and depending on its content—in case of non-matching—, the method may proceed to step S5 by issuing a stop signal and stopping the intended cutting process and/or may proceed to step S6 by issuing an adaption signal and to continue cutting with an amended sequence of cutting plans namely the one which defines target workpiece properties twp which equal the detected actual workpiece properties awp. After this, the method may and or may for back to step S1 to be reiterated again.

Optionally and preferably the comparison result cr may be output in step S7, in particular on a human machine interface HMI. The human machine interface HMI is preferably implemented on the laser cutting machine L, but needs not necessarily to be installed thereon. Other embodiments are directed to deployments, in which the human machine interface HMI may be implemented on mobile devices (for instance of the maintenance personal or operator of the laser cutting machine) and/or on a central server or on another computing device.

Further, optionally and preferably a virtual representation of the comparison result cr is generated and may be output on the human machine interface HMI in step S8. The virtual representation may be a graphical representation of the content of the comparison result cr, for example 'greenlight' for matching properties and 'red light' for mismatching properties. In the latter case (mismatching) the respective properties may be indicated graphically to provide an efficient representation of the specific unaligned property, e.g., with a graphical representation of a thickness symbol and an added alert symbol, representing the mismatch. Preferably a degree of deviation between the two properties awp, twp may be included in the virtual representation.

Further, optionally and preferably a first alert signal may be issued in step S9. The first alert signal may indicate, that the comparison result cr reflects an error or a misalignment of the properties awp, twp. The first alert signal may be provided in different formats, comprising an optical format (as visual representation) an acoustic format, and/or, vibrational format or others. The first alert signal may be provided on the human machine interface HMI and/or locally on the laser cutting machine L.

Further, optionally and preferably a second alert signal may be issued in step S10. The second alert signal may indicate, that an adaption signal has been issued and that the system automatically suggests to change the sequence of cutting plans to be executed (before actually performing the change of ordering the cutting plans). Thus, the second alert signal indirectly indicates, that the sequence of cutting plans should be or is intended to be changed by the checking tool CT according to the actual order of the workpieces WP. According to a preferred embodiment, the user will be requested to verify the intended re-ordering or to reject the same.

Further, optionally and preferably a failure analysis algorithm may be applied on the comparison result cr. Preferably every comparison result cr is stored in a memory. Due to this, the failure analysis algorithm may analyze the developments of the comparison result cr over time. Preferably, the comparison results cr are stored together with meta-data and/or timestamps. With this data, the failure analysis algorithm may detect, whether for instance negative comparison results are accumulating during night shifts or in specific time periods or for specific types of workpieces et cetera. A result of the failure analysis algorithm may be fed to the automation system AS for further improvement, in case the automation system is involved. Otherwise, if the workpieces have been loaded manually, by an operator, the failure analysis algorithm may be configured for identifying wrong preprocessing and/or wrong positioning and storage of workpieces to be loaded.

Figure 3:
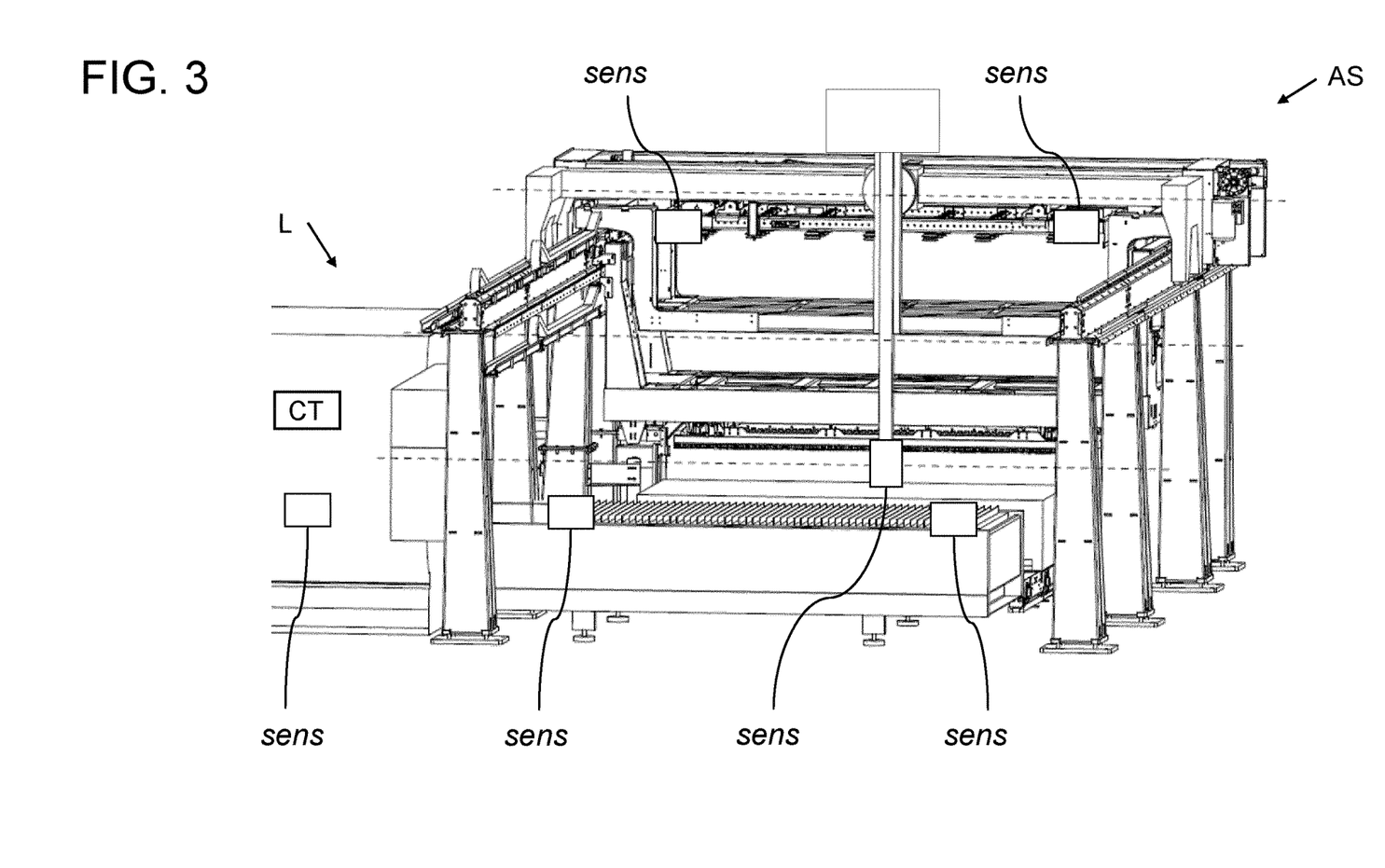
FIG. 3 is an exemplary representation of a laser cutting machine, which is fed with workpieces by means of an automation system.

FIG. 3 represents an automation system AS with a storage of different types of workpieces WP. In case the system is fully automated, the automation system AS fetches a specific workpiece WP from the storage according to received instructions and forwards the same on a working table WT, which may engage with the laser cutting machine L and moves into the same for loading the workpiece WP to the laser cutting machine L. Alternatively, the solution, described herein, may also be used without an automation system. In this case, an operator manually positions one workpiece WP on the working table WT. Also, in this case, the respective workpiece WP are analyzed with respect to its actual workpiece properties awp which are then compared to the target workpiece properties twp, as described above. As can be seen in FIG. 3, the sensors sens may be placed at different positions: in or at the laser cutting machine L, in or at the automation system AS, and/or at the working table WT. This makes it possible, to detect the workpiece properties in different time phases and/or redundantly. In the latter case, mean values may be calculated to provide a more reliable measurement result.

Figure 4:
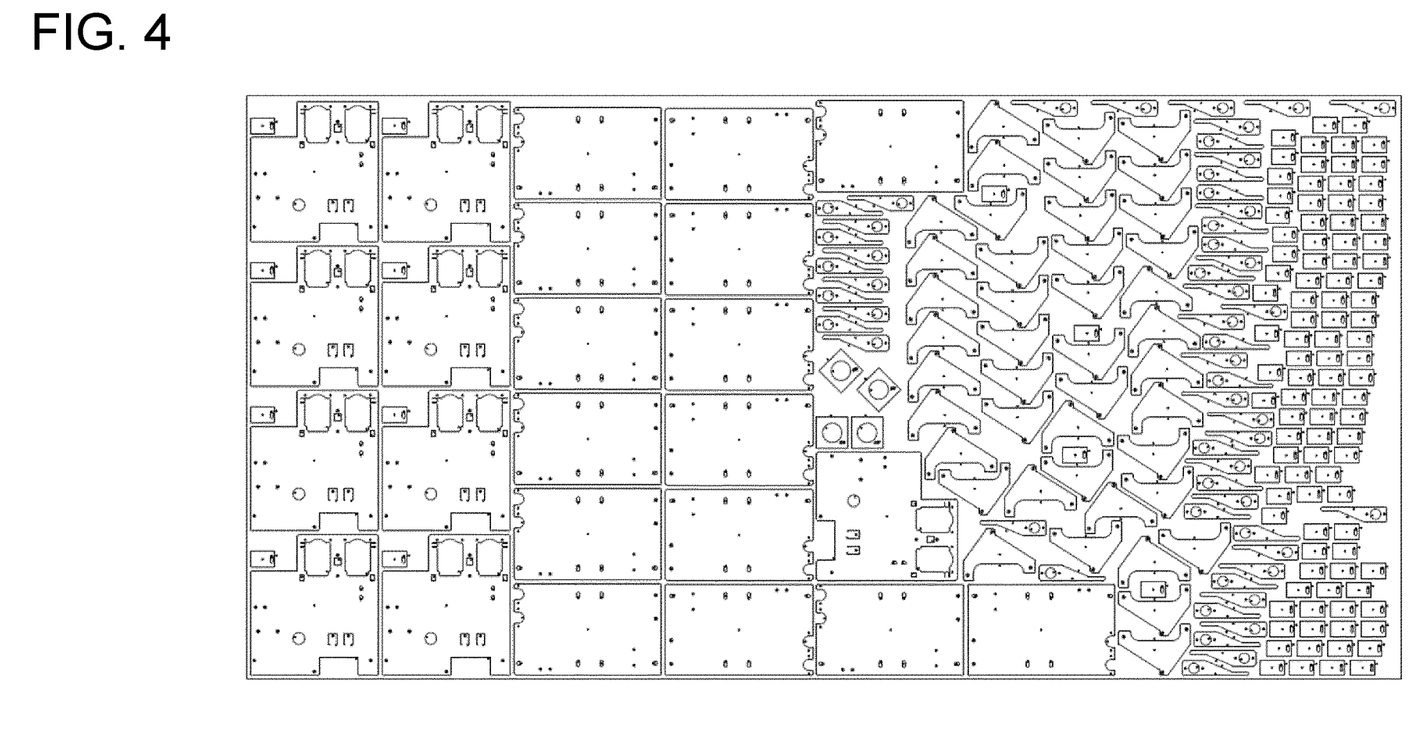
FIG. 4 is an exemplary representation of a cutting plan.

An example of a graphical representation of the cutting plan CP is represented in FIG. 4. As can be seen, different work parts need to be cut from one metal sheet workpiece WP. As can be seen on the right side of the cutting plan CP, a plurality of tiny parts needs to be cut. In order to be able to provide a high cutting quality, it is necessary to assure that e.g., the laser power parameters according to which the laser cutting machine L is operated are correctly adapted to the actual workpiece properties awp at hand. If for example the cutting plan CP is designed for steel metal in 10 mm and the workpiece WP, which is actually provided to the laser cutting machine L is steel metal in 5 mm, then, the checking tool CT will signal a mismatch. Without adaption of the laser parameters, so that trash may be generated. This can be avoided by using the checking tool CT. In particular, another cutting plan CP may be searched, which is directed to cutting a steel metal in 5 mm. The respective adaption signal may be generated. In a preferred embodiment, the user may be informed about the change of the sequence of cutting plans and may have the option to input a verification signal on the human machine interface HMI (for example by clicking a respective verification button).

Figure 5:
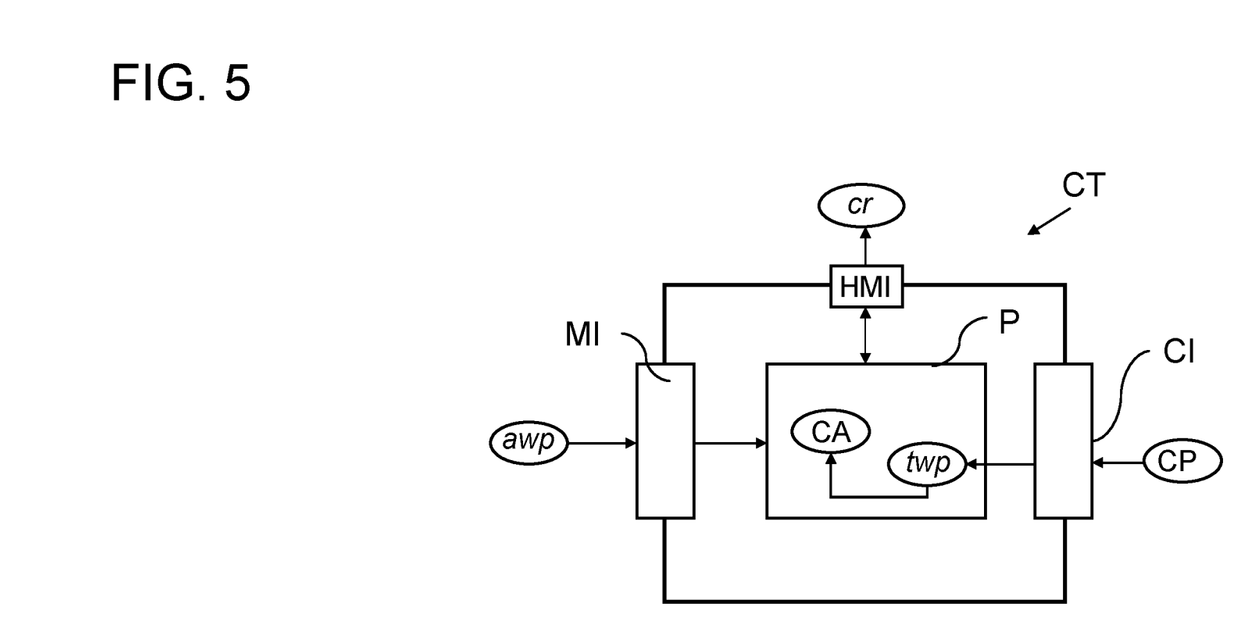
FIG. 5 is a block diagram of a checking tool according to a preferred embodiment of the present invention.

With respect to FIG. 5 more features and details of the checking tool CT will be described below. The checking tool CT may be implemented in software and/or hardware. The checking tool CT may be implemented directly on the laser cutting machine L and/or on the automation system AS and/or on other, for example, mobile devices. The checking tool CT comprises a measurement interface MI which is configured for receiving actual workpiece properties awp of the currently loaded workpiece WP. The checking tool CT further comprises a cutting plan interface CI for receiving a set of cutting plans, wherein one of the received set of cutting plans is actually loaded on the controller CNC of the laser cutting machine L. Further, the checking tool CT comprises an output interface, preferably a human machine interface HMI for providing the comparison result cr. The checking tool CT is equipped with processing means P, which are configured to execute the comparison algorithm CA. All the actual workpiece properties awp and the target workpiece properties twp are provided to the comparison algorithm in order to calculate the comparison result cr. As mentioned above, the checking tool CT may further consist of other modules, like storage and further sensors. Also, the processing means P many configured to execute further algorithms, for instance the failure analysis algorithm.

Figure 6:
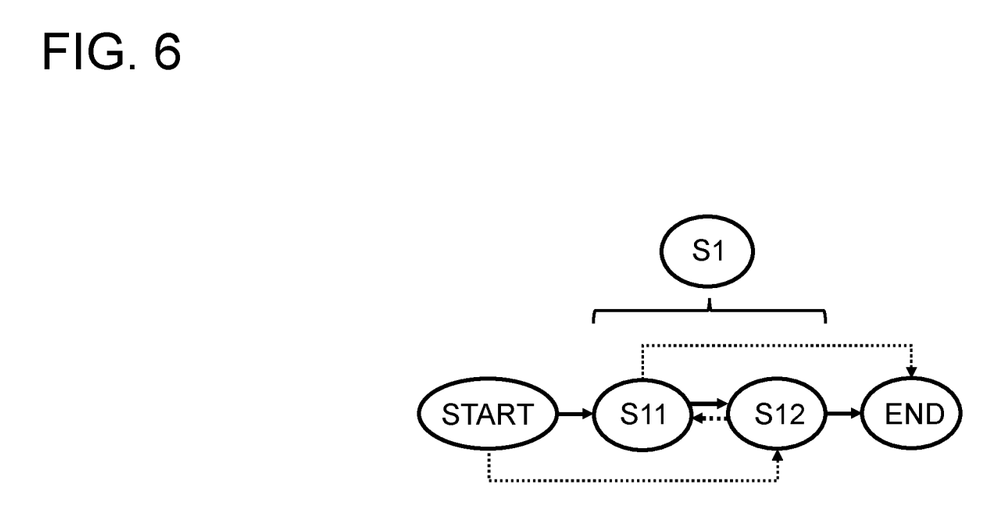
FIG. 6 is a flow chart of a step of detecting according two different preferred embodiments of the present invention.

FIG. 6 shows a flow chart with two embodiments for executing the detecting step 51. After starting, the thickness of the workpiece WP may be detected in step S11. Subsequently, the type of material of the workpiece WP may be detected in step S12. After this, the detection method may end and the method for checking may proceed to step S2.

In another embodiment the sequence of processing steps 511, S12 may be changed, so that first the type of material is detected in step S12 and subsequently the thickness of the workpiece WP is detected in step S11 before ending the method. This is reflected in FIG. 6 with the dotted lines.

Figure 7:
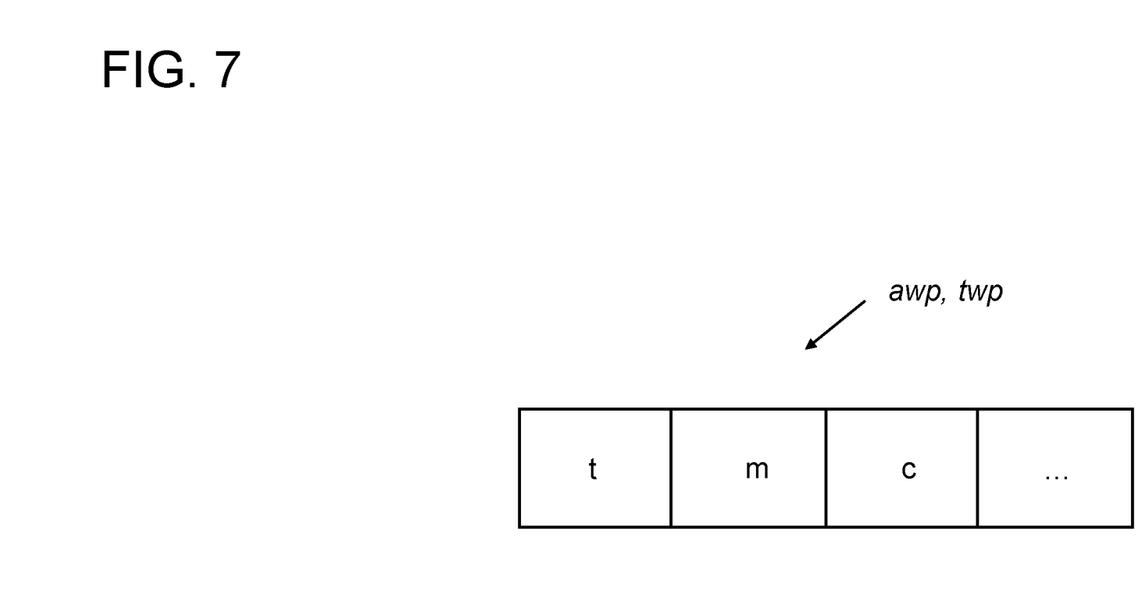
FIG. 7 is a data structure for the actual and the target workpiece properties according to a preferred embodiment of the present invention and FIG. 8 is another three-dimensional overview representation of a laser cutting machine with a connected automation system.

FIG. 7 shows a data structure encoding the workpiece properties awp, twp and for storing the same. In a configuration phase, it may be configured, which workpiece properties are to be detected, processed and to be stored. Preferably, the workpiece properties awp, twp comprise a thickness t of the workpiece, a type of material m, chemical properties c and/or others. Further parameters may be associated, like e.g., timestamp data, metadata (type of laser machine, type of automation system, software version etc.).

Figure 8:
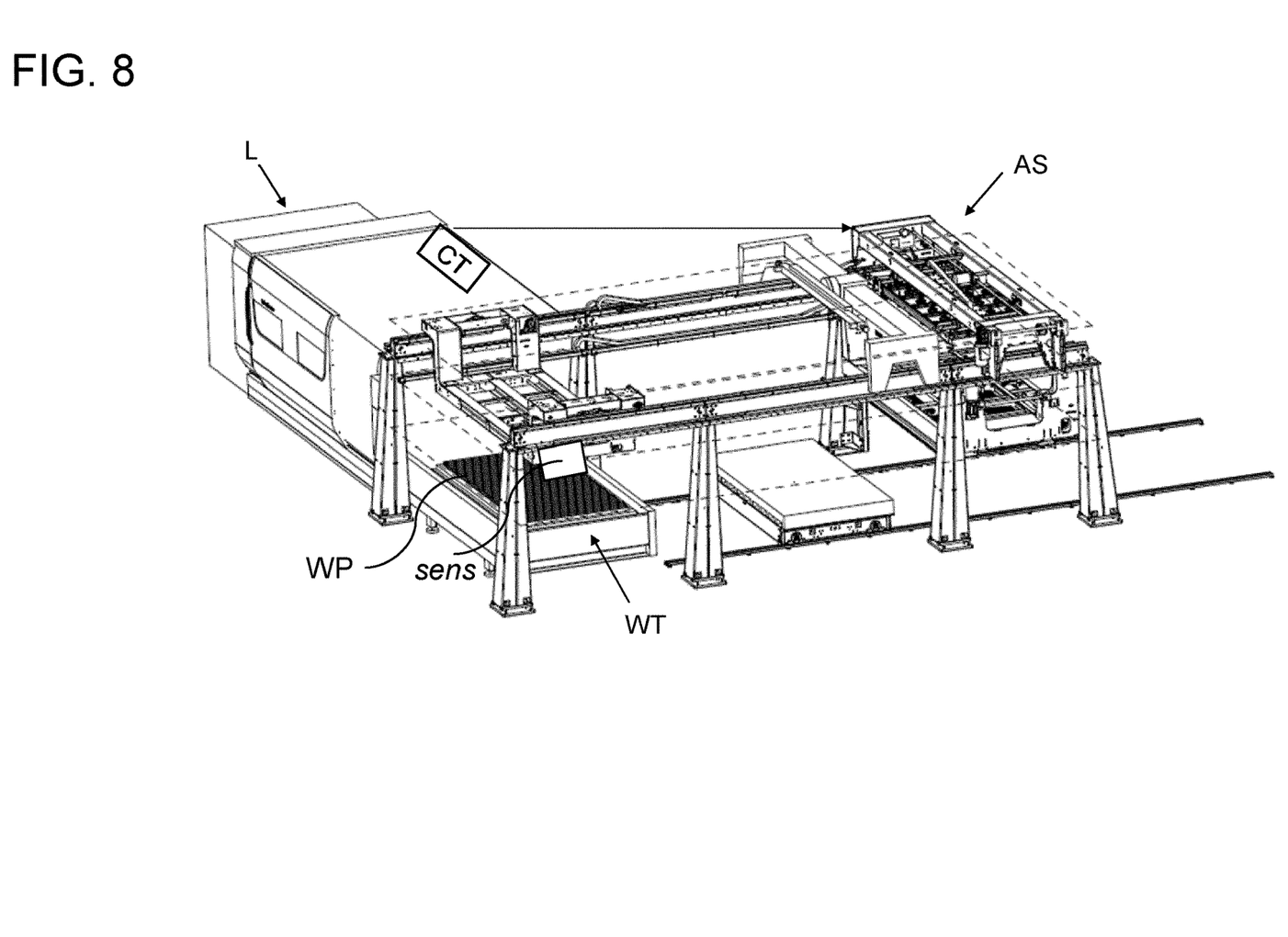

FIG. 8 represents the interaction of the laser cutting machine L, in particular the checking tool CT, which is preferably deployed on the laser cutting machine L, with the automation system AS by means of communication channel. The communication channel may be unidirectional, so that the laser cutting machine instructs the automation system to provide the requested workpiece WP. Thus, typically, the laser L acts as master and the automation system AS as slave. The laser cutting machine L is provided with a cutting plan CP. Based on the actual cutting plan CP, the laser instructs the automation system AS to fetch or provide the correct workpiece WP and thus a workpiece with correct or corresponding workpiece properties to comply with the target workpiece properties twp as defined in the cutting plan CP. By means of the sensors sens the actual workpiece properties awp are compared with the target workpiece properties twp and in case of correspondence—a threshold for deviations may be configured in a preceding configuration phase—the cutting process may continue as intended. Otherwise, it will stop or continue in an amended manner.

Alternatively, the communication between the automation system AS and the laser L may also be in two directions, so that the automation system AS may inform the laser L in case of not being able to provide the requested workpiece. This may be implemented by sending a non-availability message to the laser. Further, in case the set of sensors detect a non-matching actual workpiece property, this may also be forwarded as message to the laser L for further processing. The sensors sens may be connected wired or wirelessly to the checking tool CT, which is preferably implemented on the laser L.

Wherever not already described explicitly, individual embodiments, or their individual aspects and features, described in relation to the drawings can be combined or exchanged with one another without limiting or widening the scope of the described invention, whenever such a combination or exchange is meaningful and in the sense of this invention. Advantages which are described with respect to a particular embodiment of present invention or with respect to a particular figure are, wherever applicable, also advantages of other embodiments of the present invention.

The invention claimed is:

1. A method for checking whether a laser cutting machine is provided with a correct workpiece from a set of workpieces, comprising the steps of:
   detecting actual workpiece properties of a workpiece which is provided or is prepared to be provided to the laser cutting machine for cutting;
   providing a set of cutting plans, wherein one cutting plan of the set of cutting plans is forwarded to a control unit of the laser cutting machine, wherein each cutting plan is associated to target workpiece properties;
   comparing the detected actual workpiece properties with the target workpiece properties, and providing a comparison result, indicating whether the correct workpiece is provided according to the cutting plan; and
   depending on the comparison result, issuing a stop signal to stop the cutting process or issuing an adaption signal to change the sequence in the set of cutting plans.

2. The method according to claim 1, wherein a first alert signal is issued, when the comparison result reflects a mismatch and/or wherein a second alert signal is issued in case of issuance of the adaption signal.

3. The method according to claim 1, wherein the comparison result is stored in a storage for application in a failure analysis algorithm, in particular, together with a time stamp and/or metadata.

4. The method according to claim 1, wherein detecting is performed by electronically reading-in a code, identifying the actual workpiece properties and accessing a storage with associated properties.

5. The method according to claim 1, wherein detecting is performed before, while or after the workpiece is loaded on a working table.

6. The method according to claim 1, wherein detecting is performed by measuring actual workpiece properties by means of a set of sensors, wherein sensor signals may be subject to rule-based processing algorithm to calculate the actual workpiece properties, based on the measured sensor signals.

7. The method according to claim 1, wherein detecting is executed by a two-step procedure comprising detecting a thickness of the workpiece and
   detecting a type of material of the workpiece detecting a type of material of the workpiece.

8. The method according to claim 1, wherein comparing is executed by means of executing a comparison algorithm, which compares a first identifier related to the workpiece with a second identifier, related to a dataset in the cutting plan or associated to the cutting plan.

9. The method according to claim 1, wherein the adaption signal to change the cutting plan comprises searching in the set of cutting plans a matching cutting plan with associated target workpiece properties which comply with the detected actual properties and to continue the cutting process with the matching cutting plan.

10. The Method according to claim 1, wherein the comparison result is provided on an interface, in particular, a human machine interface, wherein the interface may be provided on the laser cutting machine and/or on a mobile device and/or on a central system.

11. The method according to claim 1, wherein the workpiece is loaded on a working table fully automatically or semi-automatically by use of an automation system.

12. A Checking tool for checking whether a laser cutting machine is provided with a correct workpiece from a set of workpieces, with a processing means configured to perform the method of claim 1 with:
   a measurement interface for detecting actual workpiece properties of a workpiece which is provided or is prepared to be provided to the laser cutting machine for cutting;
   a cutting plan interface for receiving a set of cutting plans, wherein one of the received set of cutting plans is forwarded to a control unit of the laser cutting machine, wherein each cutting plan is associated to target properties of the workpiece to be cut;
   wherein the processing means is configured for comparing the detected actual workpiece properties with the target workpiece properties, indicated in the cutting plan, and providing a comparison result, indicating whether the correct workpiece is loaded according to the cutting plan;
   an output interface for issuing a stop signal to stop the cutting process or for issuing an adaption signal to change the sequence in the set of cutting plans, both depending on the comparison result.

13. A laser cutting machine, with a checking tool or an interface to a checking tool, in accordance with claim 12.

14. A non-transitory computer readable storage medium comprising a computer program comprising computer code, that when executed by a processing means, performs the steps of the method of claim 1.

* * * * *